March 8, 1949.  A. E. FREEL  2,463,758
GLOBAL TIME INDICATOR
Filed June 24, 1946  2 Sheets-Sheet 1
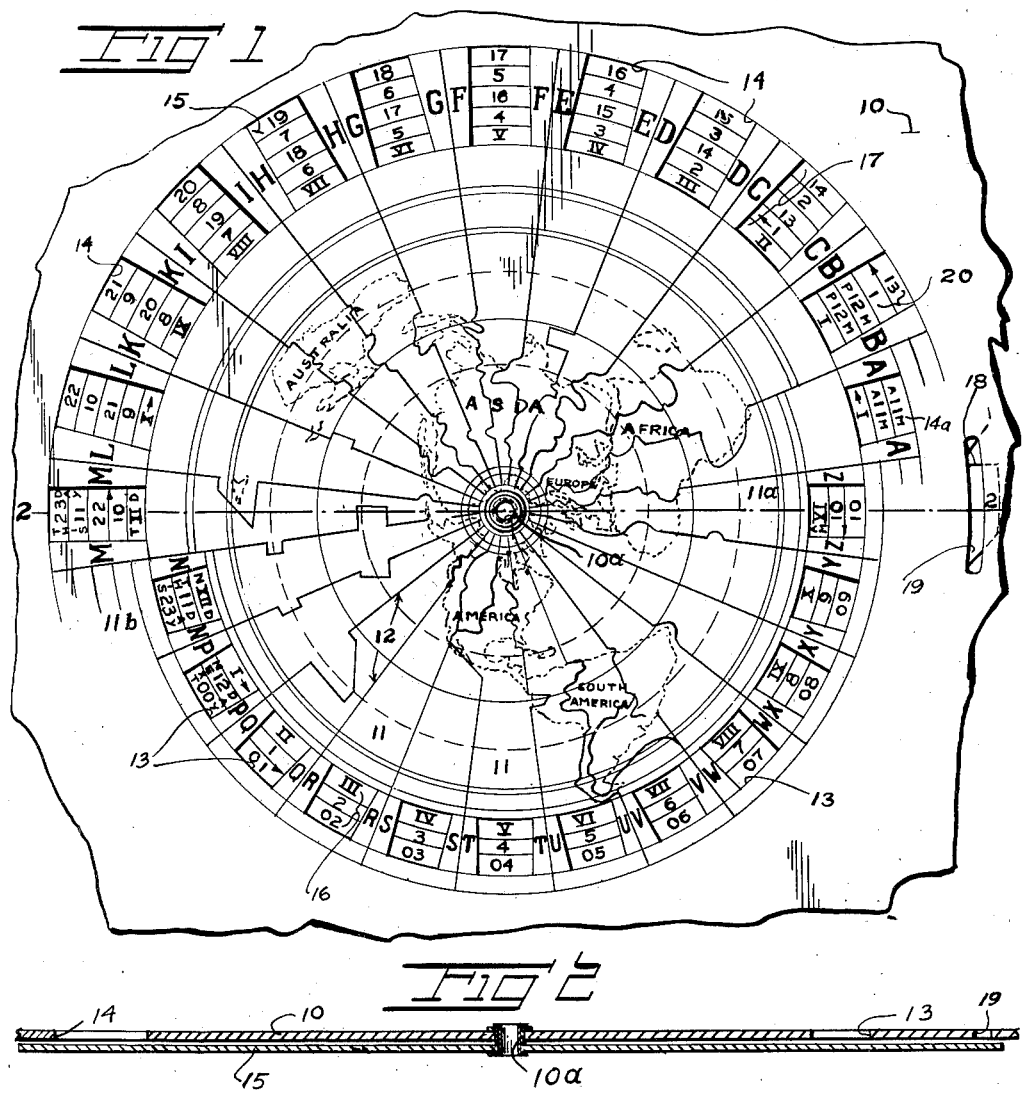
INVENTOR.
Albert E. Freel
BY
Church & Church
His Attorneys March 8, 1949.  A. E. FREEL  2,463,758
GLOBAL TIME INDICATOR Filed June 24, 1946  2 Sheets-Sheet 2

INVENTOR.
Albert E. Freel
BY Church & Church
His Attorneys

Patented Mar. 8, 1949

2,463,758

UNITED STATES PATENT OFFICE 2,463,758

GLOBAL TIME INDICATOR

Albert E. Freel, Tallahassee, Fla.

Application June 24, 1946, Serial No. 678,949

5 Claims. (Cl. 35—44)

This invention relates to time indicating devices of the type with which the time of day or night at any place whatever on the earth's surface can be indicated or computed when it is a given time of day or night at any other particular place.

One object of the invention is to provide a simple device of this character wherein the hour graduations are exposed through sight openings representing standard time zones indicated on a superposed map, all of said hour graduations being disposed in the same direction vertically with respect to the respective sight openings in which they are exposed as distinguished from certain of the time graduations appearing in inverted position.

Still another object of the invention is to provide a time indicating device of the character described in which time in a country which does not maintain standard international time can be indicated so that the time of day or night in that country can be indicated both in standard international time and in the established standard time of that particular country.

Preferably, the present device consists of a map member having a series of sight openings therein in registry with standard time zone areas and a rotatable disk beneath the map member carrying hour graduations in alinement with said sight openings and a further object of the invention is to facilitate manipulation of the rotatable disk with a step-by-step movement which will move the respective hour graduations into registry with successive sight openings in the map member. More specifically, this is accomplished by providing the map member with a slot in which a pointed instrument can be moved a distance equal to the width of a standard time zone, said instrument being engageable with recesses formed in the periphery of the movable disk and spaced from one another a distance equal to the width of said time zones.

With these and other objects in view the invention consists in certain details of construction and combinations and arrangements of parts, all as will hereinafter be more fully described and the novel features thereof particularly pointed out in the appended claims.

In the accompanying drawings—

Figure 1 is a plan view of the present device with the hour graduations of the hour disk exposed in the sight openings of the map member;

Fig. 2 is a sectional view on the line 2—2 of Fig. 1; and

Figure 3:
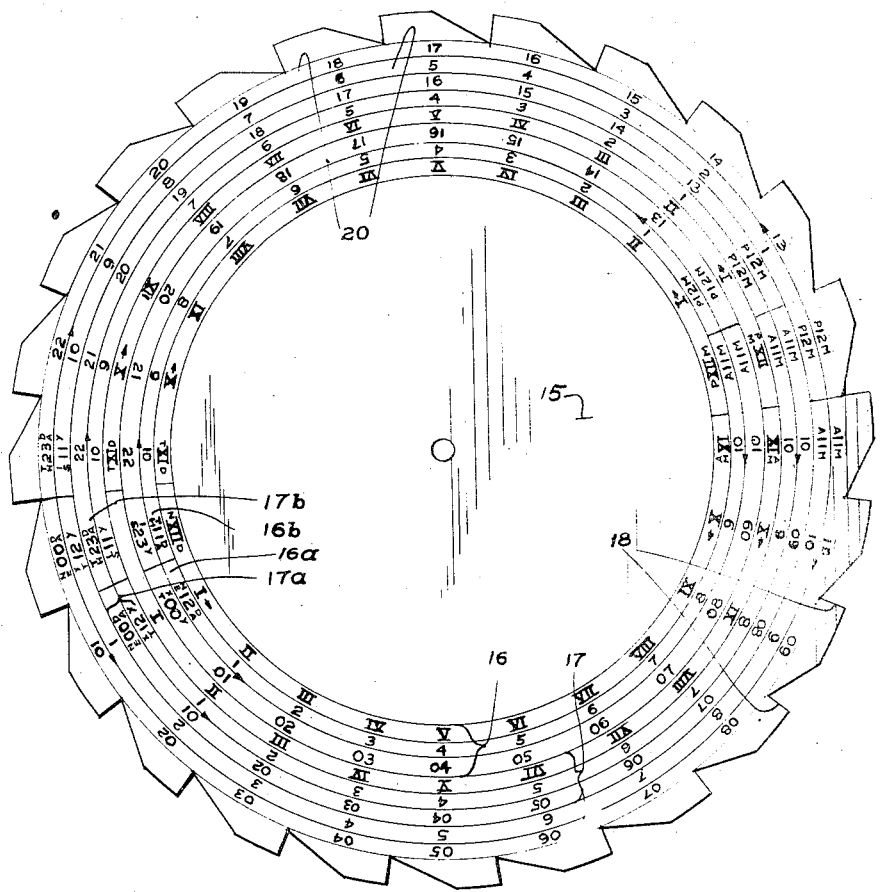
Fig. 3 is a plan view of the rotatable disk having the so-called hour graduations thereon.

The so-called map member indicated at 10 bears a map of the world with one pole at the center of the map. The standard time zones 11 are indicated on the map as distinctive sector areas by lines 12 which radiate from the center of the map, each sector representing, as will be well understood, a time period of one hour. Around the edge of the map adjacent the outer extremity of each time zone sector there is a sight opening, the openings for the twenty-four hours represented on the map being arranged in two semi-circular groups with those of one group arranged in a semi-circle of less diameter than the other. The sight openings on the lesser radius are indicated at 13 and beginning with the Greenwich mean time zone, indicated at 11$^a$, extend clockwise around the map to and including the time zone 11$^b$ preceding the zone diametrically opposite zone 11$^a$. In other words, there are twelve of these sight openings 13 in this semi-circle of lesser radius. The remaining twelve sight openings 14 arranged on a larger radius extend around the other half of the map between zones 11$^a$, 11$^b$, and are thus offset radially with respect to the sight openings 13 although the two groups are arranged concentrically with respect to the map.

The purpose of this particular arrangement of sight openings is apparent upon inspection of the hour disk 15 which is located beneath the map member 10 and rotatable on a pivot 10$^a$. For instance, this disk carries two sets of circular, concentrically arranged hour graduations or numerals representing the twenty-four hours of a complete day. If desired the hours after noon and before midnight can be indicated in any suitable fashion as by coloring those time areas to denote post meridian time while the hours from twelve o'clock midnight to noon may be suitably indicated by being uncolored or in open print, it being understood that the hour divisions in both of the concentrically arranged hour indicia are printed in the same colors or type. The innermost concentric series of hour numerals 16 are so arranged on the disk 15 that they register with the sight openings 13 of the map member 10 and the larger concentric series of hour numerals 17 on said disk register with sight openings 14. However, while the same coloring or type characters are used in printing the post and antemeridian hour numerals in these two series 16, 17, it will be observed that the numerals of one series are inverted with respect to those of the other series, the disposition of the numerals in the series 16 being such that they are disposed vertically with respect to the sight openings 13 while the numerals in the series 17 are disposed vertically in the same direction with respect to their sight openings 14. In other words, taking the uppermost opening and the lowermost opening in the two series of openings 13, 14, as an example, the hour numerals in both of said openings will always appear in an upright position. Likewise, the hour numerals in any two diametrically opposed sight openings will always be disposed in the same direction with respect to said openings. Thus, regardless of how the indicator is viewed no hour numeral will ever appear in an inverted position, thus materially facilitating the reading of the instrument.

The hour numerals on disk 15 are so spaced circumferentially thereof that they are each positioned substantially centrally of one of the sight openings in the map member 10 and, as will be understood, when the instrument is used the disk 15 is adapted to be rotated clockwise beneath the map member until the hour numeral representing the hour of the day which is to be the basis of the contemplated calculation is displayed in the sight opening of the proper sector which constitutes the other factor in said calculation. To facilitate this movement of the disk and to impart a step-by-step movement to the disk equal to the width of the individual sectors and sight openings, the disk is formed with a plurality of recesses 18 in its peripheral edge with the successive recesses spaced apart an angular distance corresponding to the angular width of the individual time sectors and sight openings. These recesses are adapted to be engaged by a pointed instrument which is inserted in one end of an arcuate slot 19 in the map member 10 and moved along said slot clockwise with respect to the map, the length of said slot substantially corresponding to the width of the zone sectors 11 so that by inserting the instrument in the slot and engaging successive recesses 18 the disk can be rotated clockwise with a step-by-step movement equal to the width of the time zone sectors or equal to the distance between successive hour numerals on disk 15. The length of slot 19 need only exceed the angular distance between successive notches or successive hour numerals on the disk by the thickness of the point of the instrument used in rotating the disk.

If desired each group of hour numerals 16, 17, may comprise three series of numerals arranged in three concentric bands on disk 15. For instance, the inner band of each group may display the hour in two twelve-hour periods using Roman numerals and with these numerals so arranged as to denote so-called summer or day light savings time; the next outer or intermediate band of the group may have the hour numerals arranged to denote international standard time in two groups of twelve hours each using the numerals 1 to 12; and the third or outermost band may have the numerals arranged to denote international standard time on the "twenty-four hour basis," using the numerals "00" for midnight and the consecutive numerals 1 to 23. In addition, the hour division 16ª of series 16 carrying hour numeral 12 denoting midnight also carries the notation "next day" with an arrow pointing counter-clockwise of the disk and hour division 16ᵇ of series 16 carrying the hour numeral 11 denoting eleven o'clock post meridian time carries the notation "this day." Thus, an individual using the instrument will never become confused by the changing of days at midnight because, after once having set the disk according to the hour of the day upon which he is basing his calculations, these notations will indicate that point around the world at which the day is changing from one to the next. These same notations of "this day" and "next day" also appear on the hour divisions 17ª and 17ᵇ of group 17 of hour numerals.

It will be realized that throughout the world there are certain areas or localities in which the time is based on a local meridian or otherwise differs from the international standard time of the zone in which they are located and that there are other areas in which there is no standard time and in which only local sun time may be said to be observed. Legends or notations covering these conditions and various other legends or instructions may be imprinted on the map member 10 or exposed areas of disk 15 to aid or instruct one in the use and reading of the instrument but such matter is usually found on all instruments of this kind and hence forms no part of the present invention and need not be illustrated or described in detail.

A further feature of the present invention is the provision of means for displaying and calculating the hour of the day in a country which has a standard time differing from what would be international standard time in the zones of that country based on Greenwich meridian time. For instance, Russia uses as its standard time "Soviet time" which is one hour later than Greenwich mean time. In such an instance it might be desirable to know both the Soviet time in the Russian time zones as well as the international time in those zones based on Greenwich mean time and, for this purpose, the sight openings for the sectors of the time zones in which Russia is located are made of greater length radially of disk 15 than the other sight openings of the instrument. That is, as shown in the present instance, the sight openings for the eleven time zones counting clockwise from time zone 11ᵇ are somwhat elongated compared to the remaining sight openings so as to expose a third group of hour numerals 20 on disk 15. This group 20 of hour numerals may comprise two bands of numerals, one showing the time in double twelve-hour time to indicate ante-meridian and post meridian time and the second band denoting the time in consecutive numerals or twenty-four hour time. The excessive length of these sight openings for displaying Soviet time numerals 20 can best be appreciated by comparing them with sight opening 14ª, which is one of the sight openings in the semi-circular group 14. It will be observed that only standard time based on Greenwich mean time is displayed through this opening 14ª because it is of less length than the other openings of group 14. Thus, due to the size of opening 14ª and the radially inward offsetting of the openings of group 13, the Soviet time numerals 20 on disk 15 are never exposed except through the eleven elongated sight openings in the time zones which are embraced by Russian territory.

What is claimed is:

1. A global time indicator comprising a stationary map member bearing a map of the world, said map having standard international time zones indicated thereon as distinctive sector areas, a series of sight openings in the map member in alinement with half of said sector areas, a second series of openings in alinement with the remaining sector areas, said second series of openings being located from the center of the map a greater distance than the first series, a second member movable beneath said map member, and two series of hour denoting numerals on the movable member offset with respect to each other with the numerals of one series inverted with respect to those of the other series, one of said series being positioned in alinement with one of said series of sight openings and the other series of hour numerals being located in alinement with the second series of sight openings.

2. A global time indicator comprising a stationary disk bearing a map of the world with one pole at the center of the map, said map having standard international time zones indicated thereon as distinctive sector areas, a semi-circularly arranged series of sight openings in the map member in radial alinement with half of said sector areas, a second series of semi-circularly arranged sight openings in radial alinement with the remaining sector areas, said two series of openings being arranged concentrically of the map on different diameters whereby one series is offset radially with respect to the other, a rotatable disk beneath the stationary disk and two series of hour denoting numerals on said disk arranged concentrically of the map with the numerals of one group in alinement with the openings of one series of sight openings and with the numerals of the other series in alinement with the other series of sight openings, the numerals of one of said series of numerals being inverted with respect to those of the other series of numerals.

3. A global time indicator comprising a stationary disk bearing a map of the world with one pole at the center of the map, said map having standard international time zones indicated thereon as distinctive sector areas, a semi-circularly arranged series of sight openings in the map member in radial alinement with half of said sector areas, a second series of semi-circularly arranged sight openings in radial alinement with the remaining sector areas, said two series of openings being arranged concentrically of the map on different diameters whereby one series is offset radially with respect to the other, a rotatable disk beneath the stationary disk, two series of hour denoting numerals on said disk arranged concentrically of the map with the numerals of one group in alinement with the openings of one series of sight openings and with the numerals of the other series in alinement with the other group of sight openings, the numerals of one of said series being inverted with respect to the numerals of the other series, a circular series of notches in the rotatable disk with successive notches spaced from each other an angular distance substantially equal to the distance between successive hour numerals in one of said series of hour numerals, and an arcuate slot in the fixed disk in registry with the notches in the rotatable disk, the length of said slot substantially corresponding with the spacing of the notches in said rotatable disk.

4. A global time indicator comprising a stationary map member bearing a map of the world with one pole at the center of the map, said map having standard international time zones indicated thereon as distinctive sector areas, a series of semi-circularly arranged sight openings in the map member disposed concentrically of the map center and in radial alinement with half of said sector areas, a second series of semi-circularly arranged sight openings in the map member concentric with the center of the map and in radial alinement with the remaining sector areas, said second series of openings being formed on a larger diameter than the first series of sight openings, certain of the second series of sight openings being of greater length radially of the map than the remaining openings, said enlarged sight openings corresponding to time zone sector areas of a geographical territory using local standard time as distinguished from standard international time, a disk rotatable beneath said map member, reversely disposed hour numerals denoting standard international time arranged in concentric circular bands on said rotatable disk, one of said bands being in alinement with the series of sight openings of lesser diameter and the other of said bands being in alinement with the inner ends of the other series of sight openings, and a third concentric band of hour numerals on said rotatable disk denoting said local standard time for said geographical territory and disposed in alinement with the outer ends of the sight openings of greater radial length of said other series.

5. A global time indicator comprising a stationary map member bearing a map of the world with one pole at the center of the map, said map having standard international time zones indicated thereon as distinctive sector areas, a semi-circularly arranged series of sight openings in the map member in radial alinement with half of said sector areas, a second semi-circularly arranged series of sight openings in the map member in radial alinement with the remaining sector areas, certain of said sight openings in radial alinement with zone sectors embracing a geographical territory using a local standard time not based on Greenwich meridian time extending radially beyond the remaining sight openings, a disk rotatable beneath said map member and two bands of hour numerals on said disk disposed concentrically with respect to said map, the hour numerals of the inner band denoting standard time based on Greenwich mean time and being located in registry with the radially inner portions of said sight openings and the hour numerals in the outer band denoting said local standard time of said geographical territory and being located in alinement with the radially extended portions of said certain sight openings.

ALBERT E. FREEL.

REFERENCES CITED

The following references are of record in the file of this patent:

UNITED STATES PATENTS

| Number | Name | Date |
| --- | --- | --- |
| 1,553,222 | Denoyer | Sept. 8, 1925 |
| 1,694,877 | Hutchings | Dec. 11, 1928 |
| 2,039,921 | Murphy | May 5, 1936 |